US012626898B2

(12) United States Patent
Holz et al.

(10) Patent No.: US 12,626,898 B2
(45) Date of Patent: May 12, 2026

(54) 3D ION TRAPS WITH CONNECTION THROUGH SUBSTRATE

(71) Applicant: Alpine Quantum Technologies GmbH, Innsbruck (AT)

(72) Inventors: Philip Holz, Innsbruck (AT); Georg Jacob, Innsbruck (AT)

(73) Assignee: Alpine Quantum Technologies GmbH, Innsbruck (AT)

( * ) Notice: Subject to any disclaimer, the term of this patent is extended or adjusted under 35 U.S.C. 154(b) by 367 days.

(21) Appl. No.: 18/533,306

(22) Filed: Dec. 8, 2023

(65) Prior Publication Data

US 2024/0371624 A1 Nov. 7, 2024

(30) Foreign Application Priority Data

Dec. 9, 2022 (EP) .................................... 22212397

(51) Int. Cl.
*H01J 49/42* (2006.01)

(52) U.S. Cl.
CPC .................................. *H01J 49/424* (2013.01)

(58) Field of Classification Search
None
See application file for complete search history.

(56) References Cited

U.S. PATENT DOCUMENTS

| | | | | |
|---|---|---|---|---|
| 6,911,650 | B1 * | 6/2005 | Park | H01J 49/063 250/282 |
| 2007/0023646 | A1 | 2/2007 | Li et al. | |
| 2008/0067342 | A1 | 3/2008 | Ding | |
| 2011/0016700 | A1 | 1/2011 | Egley et al. | |
| 2012/0305759 | A1 * | 12/2012 | Park | H01J 49/424 250/281 |
| 2020/0294783 | A1 * | 9/2020 | Xiao | H01J 49/4225 |
| 2022/0102301 | A1 | 3/2022 | Roessler et al. | |
| 2023/0260777 | A1 * | 8/2023 | Wang | H01J 49/424 |

FOREIGN PATENT DOCUMENTS

| | | | |
|---|---|---|---|
| CN | 1585081 | A | 2/2005 |
| CN | 102473580 | A | 5/2012 |
| CN | 114358297 | A | 4/2022 |
| JP | 2003298240 | A | 10/2003 |
| JP | 20075306 | A | 1/2007 |
| JP | 2008502097 | A | 1/2008 |
| JP | 2013191620 | A | 9/2013 |

* cited by examiner

*Primary Examiner* — Eliza W Osenbaugh-Stewart
(74) *Attorney, Agent, or Firm* — The Webb Law Firm

(57) ABSTRACT

The present disclosure provides electrode portions for generating electric and/or magnetic fields for trapping ions in a trapping zone, a three-dimensional (3D) ion trap including one or more of such electrode portions, systems for trapping ions with such a 3D ion trap, as well as methods for manufacturing such electrode portions. An electrode portions includes an electrode body made of an electrically insulating substrate and elongated in a first direction towards the ion trapping zone, a peak electrode located on an extremity of the electrode body closest to the trapping zone or a side electrode located laterally relative to the extremity, and a connection connected to the peak electrode and leading from the peak electrode through said electrode body away from the trapping zone.

12 Claims, 4 Drawing Sheets

3D ION TRAPS WITH CONNECTION THROUGH SUBSTRATE

CROSS-REFERENCE TO RELATED APPLICATION

This application claims priority to European Patent Application No. 22212397.8 filed Dec. 9, 2022, the disclosure of which is hereby incorporated by reference in its entirety.

BACKGROUND OF THE INVENTION

Field of the Invention

Embodiments of the present disclosure relate to the field of 3D ion traps.

Description of Related Art

A device for electric trapping of charged particles (ions), also referred to as “ion trap”, typically includes a plurality of electrodes that generate the electric fields for confining the ions typically to a small region of a vacuum chamber. Ion traps are used in many technical applications, such as information processing (quantum computing, quantum simulations), atomic and molecular experiments, spectroscopy, mass spectrometry, atomic/optical clocks, and metrology.

Such typical applications often require a very accurate and precise ion trap, i.e. a trap that generates, with very high accuracy, a very specific (predetermined/desired) electric and/or magnetic field configuration.

SUMMARY OF THE INVENTION

It may be desirable to increase the performance of ion traps.

In some embodiments, this is achieved by routing the electric connection to an electrode of a 3D trap through the non-conducting substrate on which the electrode is located.

The present disclosure is defined by the independent claims. Some of the advantageous embodiments are subject matter to the dependent claims.

In some embodiments of the present disclosure a three-dimensional (3D) ion trap is provided. The 3D ion trap comprises a plurality of electrode portions for trapping ions in a trapping zone. Each of one or more of said plurality of electrode portions comprises: (i) an electrode body made of an electrically insulating substrate and elongated in a first direction towards the ion trapping zone; (ii) a peak electrode located on an extremity of the electrode body closest to the trapping zone or a side electrode located on the electrode body laterally of the extremity; and (iii) a connection connected to the peak electrode or to the side electrode and leading (from the peak electrode or from the side electrode, respectively) through said electrode body away from the trapping zone.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which.

Figure 1B:
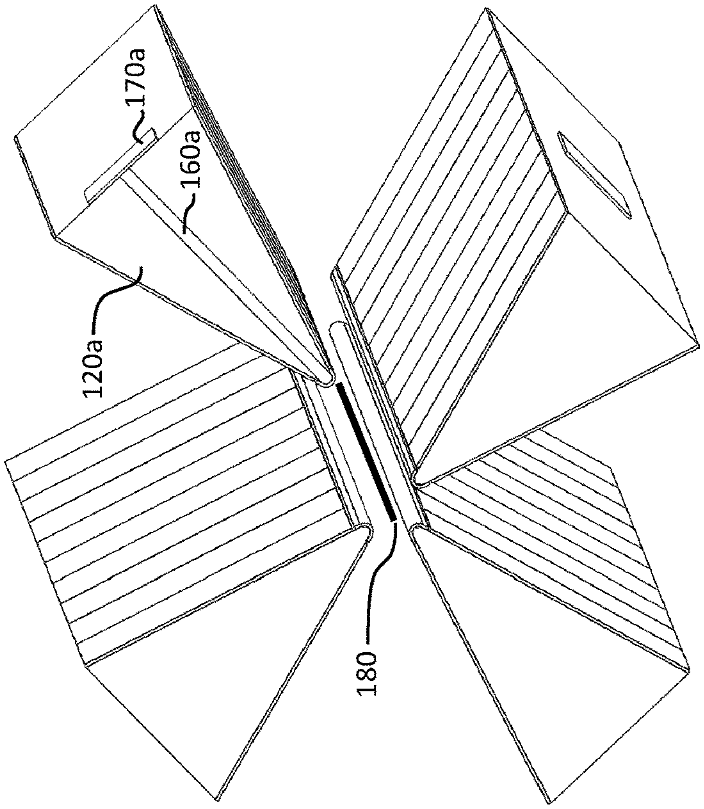
FIG. 1B is a schematic drawing showing a three-dimensional view of the exemplary ion trap of FIG. 1A with a cut of the upper right electrode portion.

It is to be expressly understood, however, that the drawings are for the purpose of illustration and description only and are not intended as a definition of the limits of the disclosed subject matter. Furthermore, it is noted that identical reference signs refer to identical or at least functionally equivalent features.

DESCRIPTION OF THE INVENTION

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

It is understood that the features of the various exemplary embodiments and/or aspects described herein may be combined with each other, unless specifically noted otherwise.

For purposes of the description hereinafter, the terms “end,” “upper,” “lower,” “right,” “left,” “vertical,” “horizontal,” “top,” “bottom,” “lateral,” “longitudinal,” and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles “a” and “an” are intended to include one or more items and may be used interchangeably with “one or more” and “at least one.” Furthermore, as used herein, the term “set” is intended to include one or more items (e.g., related items, unrelated items, a combination of related and unrelated items, and/or the like) and may be used interchangeably with “one or more” or “at least one”. Where only one item is intended, the term “one” or similar language is used. Also, as used herein, the terms "has," "have," "having," or the like are intended to be open-ended terms. Further, the phrase "based on" is intended to mean "based at least partially on" unless explicitly stated otherwise.

3D Ion Traps

In general, ion traps use electric and/or magnetic fields to trap ions. Surface traps are traps where all electrodes, generating said fields, are located (essentially) in or on a same plane. In the present disclosure, the term "3D trap" refers to any ion trap, which is not a surface ion trap. In a 3D trap, the electrodes are thus located on different planes. More specifically, some electrodes in different planes, while some electrodes may still be in a same plane. In other words, the term 3D ion trap refers to a (three-dimensional) assembly with a plurality of electrodes which, when driven, generate electric and/or magnetic field(s) that limits the freedom of movement of ions so that they may not escape a particular (preferably small) region in the vicinity of those electrodes.

A 3D trap is thus a device employable to "trap" ions, i.e. employable to spatially confine ions to a particular (small) region, here also referred to as "trapping zone". For 3D traps, this region is usually inside the ion trap, i.e. there are usually electrodes on different sides/directions of the trapping zone of a 3D trap. These directions may correspond to a symmetry of the 3D trap, often a continuous or discrete rotational symmetry. For instance, in case of a discrete rotational symmetry of order n, being an integer greater than 1, there may be n electrodes at n respective directions which are related by rotations around the trap axis by angles of $(360°/n)\cdot m$, where m=0, 1, 2, . . . , n−1.

A 3D trap may be a linear 3D trap, a Penning or a Paul trap. These non-limiting examples of 3D ion traps are presented in more detail below. However, it is noted that the present disclosure is not limited to these examples or any particular type of 3D trap. It is also noted that the actual ion trap device/system may include further mechanical and electrical components such as fixing means, electrical contacts, housing, power source, control circuitry, means to cool ions or the like.

A Penning trap refers to a trap that uses static electric and static magnetic fields to trap the ions. Usually, in a Penning trap solely static electric fields are used. In other words, usually no oscillating and/or alternating fields are used. For instance, to confine charged particles radially, a static magnetic field $\hat{B}=B_z\hat{e}_z$ in the axial direction may be used. The magnetic field $\hat{B}$ forces the charged particles to perform circular motion with angular frequency $\omega=|B_z|\cdot q/m$, where q and m are respectively charge and mass of the charged particles. Furthermore, in order to confine the charged particles axially, a static electric quadrupole potential $V(z, r)=V_0(z^2-r^2/2)$ may be used.

A Paul trap refers to a trap that uses electric fields to trap the ions. Usually, in a Paul trap, only electric fields are used to trap the ions. In particular, usually no magnetic fields are used. In general, at least one of the electric fields of a Paul trap is alternating (e.g., oscillating), and a Paul trap may use both static as well as alternating electric fields. For example, the alternating field of a Paul trap may be an alternating electric multipole field, in particular, an electric quadrupole field. Since the switching of the voltage is often at radio frequency, these traps are also called Radio Frequency (RF) traps.

A linear 3D trap is a particular type of a 3D trap. Usually, in a linear 3D trap, the ions are confined radially using an alternating (AC) electric field and confined axially by static (DC) electric potentials. Accordingly, a linear 3D trap is in general also a (linear) Paul trap.

Typical applications of 3D ion traps often require very high accuracy and precision, e.g. in terms of the symmetry of the generated electric and/or magnetic fields.

EMBODIMENTS

Figure 1A:
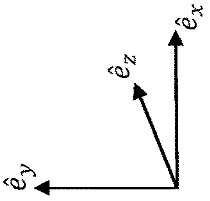
FIG. 1A is a schematic drawing showing a three-dimensional view of an exemplary ion trap.

According to an embodiment, a three-dimensional (3D) ion trap is provided. The 3D ion trap comprises a plurality of electrode portions for trapping ions in a trapping zone. FIGS. 1A and 1B illustrate an example of such an ion trap having four electrode portions 100*a*, 100*b*, 100*c*, and 100*d*. Each of one or more (or even each) of said plurality of electrode portions comprises:

(i) an electrode body made of an electrically insulating substrate and extending (e.g. protruding) towards the ion trapping zone (in the present disclosure, the direction towards which the substrate is extending is also referred to as "first direction");
(ii) a peak electrode located on an extremity of the electrode body closest to the trapping zone; and
(iii) a connection connected to the peak electrode and leading from the peak electrode through said electrode body away from the trapping zone.

For instance, in FIGS. 1A and 1B, electrode portion 100*a* comprises: (i) an electrode body 120*a*, which is made of an electrically insulating substrate and extending (in a "first direction") towards the ion trapping zone 180; (ii) a peak electrode 140*a* located on an extremity of the electrode body 120*a* closest to the trapping zone 180; and (iii) a connection 160*a* connected to the peak electrode 140*a* and leading from the peak electrode 140*a* through said electrode body 120*a* away from the trapping zone 180. It is noted that the other electrode portions 100*b* to 100*d* may be constructed in the same way as the electrode portion 100*a*, i.e. any or each of the other electrode portions 100*b* to 100*d* may include (i) a respective electrode body, made of an electrically insulating substrate and extending (in a direction) towards the ion trapping zone; (ii) a respective peak electrode, which is located on an extremity of the respective electrode body and closest to the trapping zone; and (iii) a respective connection, which is connected to the respective peak electrode and leading from the peak electrode through said electrode body away from the trapping zone.

Alternatively (or in addition, as is discussed in detail below) to the peak electrode 140*a*, one or more of said plurality of electrode portions 100*a* comprises a side electrode 150*a* located on the electrode body 120*a* laterally of the extremity. Correspondingly, the connection is provided so that it is connected to the side electrode 150*a* and leading from the side electrode through said electrode body 120*a* (at least partly within the electrode body) away from the trapping zone 180.

Figure 2:
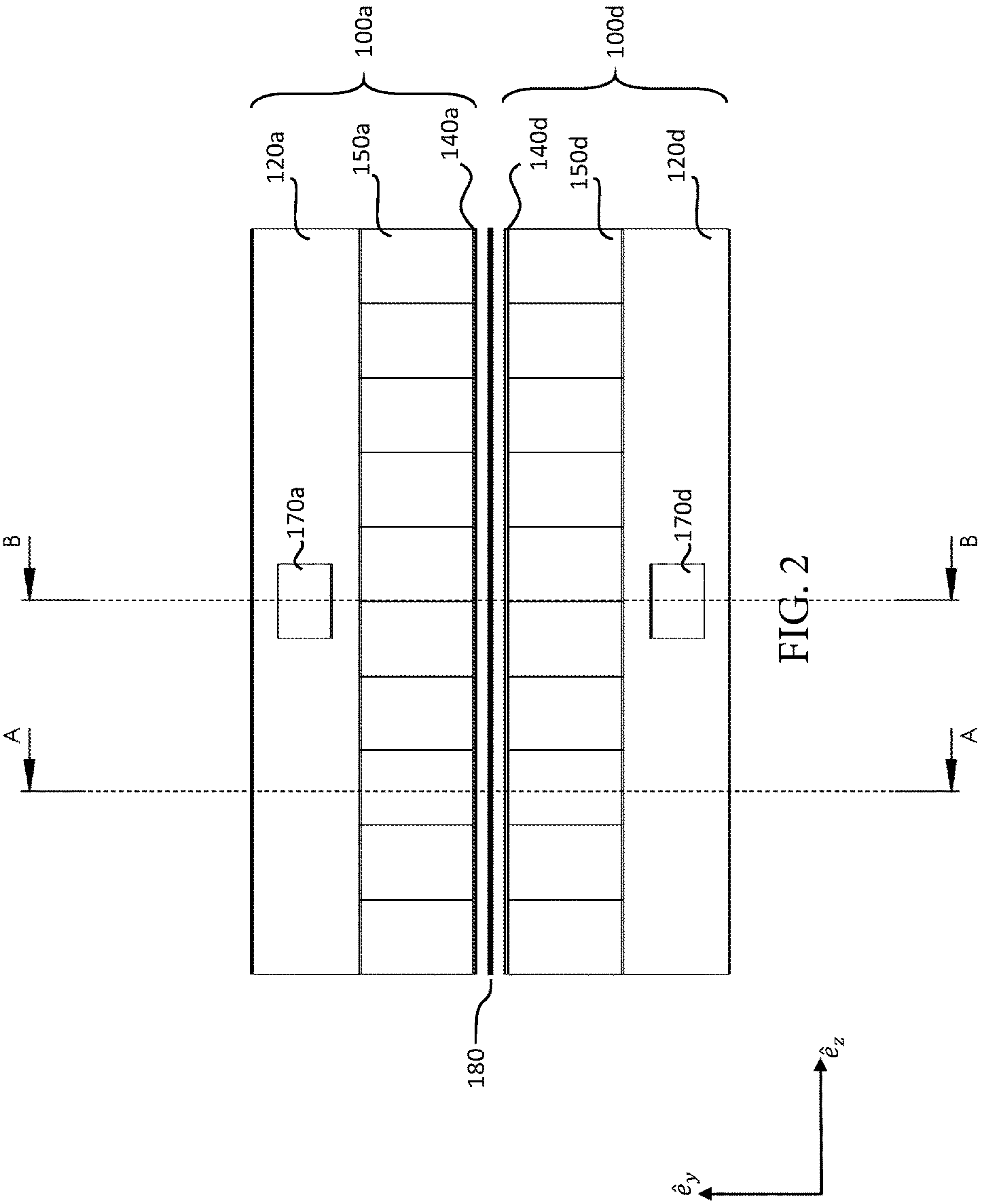
FIG. 2 is a two-dimensional view, in the radial direction, onto the exemplary ion trap of FIG. 1A
Figure 3B:
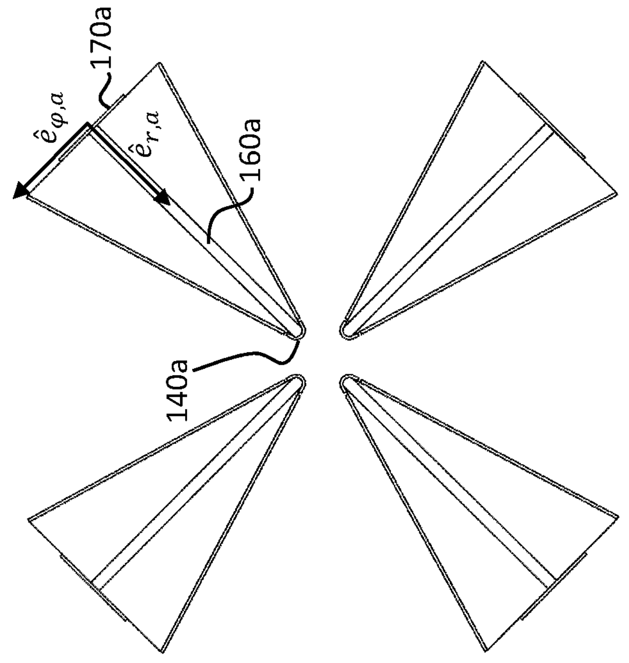
FIG. 3B is a two-dimensional section view, in the axial direction, of the exemplary ion trap of FIG. 1A at another axial position than in FIG. 3A.
Figure 3A:
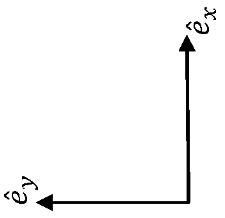
FIG. 3A is a two-dimensional section view, in the axial direction, of the exemplary ion trap of FIG. 1A with view in the axial direction.

FIG. 2 shows a two-dimensional view (and not a cut) of the exemplary ion trap of FIGS. 1A (and 1B). More specifically, FIG. 2 shows a view in the y-z plane looking from a point on the right of the structure depicted in FIG. 1A in the "minus x"-direction (in other words, from a point with a positive x-value into the direction opposite to the x-direction). FIGS. 3A and 3B show two-dimensional cuts through the electrode portions of the exemplary ion trap of FIG. 1A. More specifically, the horizontal axis of FIGS. 3A and 3B correspond to the x-direction of FIG. 1A, and the vertical axis of FIGS. 3A and 3B corresponds to the y-direction of FIG. 1A. Furthermore, z-position of the cut of FIG. 3A corresponds to the position of the vertical dashed line in indicated by the "A"-arrows in FIG. 2, and z-position of the cut of FIG. 3B corresponds to the position of the vertical dashed line in indicated by the "B"-arrows in FIG. 2.

Figure 1A:
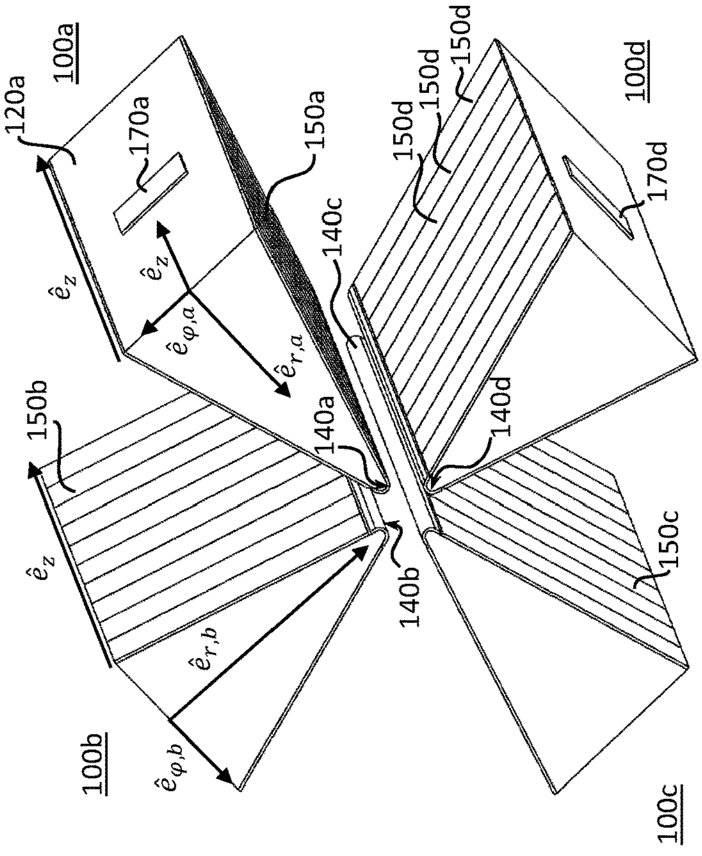
Figure 3A:
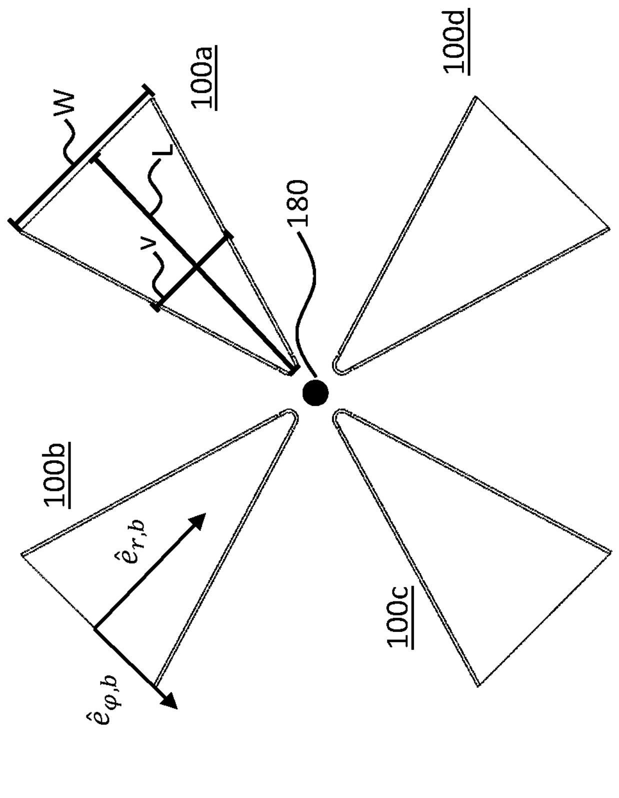

In FIG. 3, each of the four electrode portions is exemplarily shown to have a connection trough the respective electrode body. However, the present disclosure is not limited thereto as in general only one electrode portions may have a connection through its electrode body and an electrode portions may also have more than a single connection through its electrode body. These connections may be located at different positions along the direction of the trapping zone (third direction corresponding to the z-axis of FIG. 1).

Trapping Zone

In general, the trapping zone is a zone to which ions are confined when appropriate voltages are applied to the electrodes. Furthermore, in general, the trapping zone may extend in a particular direction, here also referred to as "axial direction" or "third direction", which may be a/the symmetry axis of the ion trap. For instance, the trapping zone may be a linear trapping zone and/or correspond to a line around which trapped ions will be located/trapped. The third direction thus refers to the direction along or parallel to said line/trapping zone.

For instance, in FIG. 1A, the trapping zone 180 is schematically indicated as a line in the z-direction. This line may e.g. correspond to the location where an ion will have a minimum potential energy with respect to the electromagnetic fields generated by the ion trap (ignoring e.g. the Coulomb interaction with other ions). Due to residual motional energy, the trapped ions will then usually be trapped in an area around said line. In other words, the trapping zone may not be said line (e.g. line 180), and trapping zone may extend in the radial direction from said line. The width of the trapping zone in the radial/first direction depend on the temperature of the trapped ions and/or the strength of the voltages applied to the electrodes. In particular, the trapping zone may correspond to a linear symmetry axis of the ion trap (e.g. the trapping zone may extend along the symmetry axis) and/or the "third direction" may be parallel to the symmetry axis of the ion trap.

Here it should be noted that 3D ion traps usually have a rotational symmetry (continuous or discrete), e.g., a discrete cylindrical symmetry or a continuous cylindrical symmetry. Without loss of generality, the symmetry axis of such a rotational or cylindrical symmetry may be assumed to be parallel to the z-axis of a Cartesian coordinate system in which the axes are represented by three mutually orthogonal unit vectors $\hat{e}_x$, $\hat{e}_y$, and $\hat{e}_z$. For instance, in FIG. 1A, the trap has a discrete 90° rotational symmetry with respect to rotations around the z-axis. In this context, the symmetry axis (or $\hat{e}_z$) is also referred to as the "axial direction", and the local basis vectors $\hat{e}_r(x, y)=(x\hat{e}_x+y\hat{e}_y)/\sqrt{x^2+y^2}$ and $\hat{e}_{100}(x, y)=(-y\hat{e}_x+x\hat{e}_y)/\sqrt{x^2+y^2}$ as the "radial direction" and "tangential direction" (at the point $(x, y, 0)=x\hat{e}_x+y\hat{e}_y$), respectively. It is noted that the "radial direction", "tangential direction" and "axial direction" may correspond to the directions here termed as "first direction", "second direction" and "third direction", respectively. It is however noted that $\hat{e}_r(x, y)$ and $\hat{e}_\varphi(x, y)$ are local basis vectors/directions. For instance, in FIG. 1A, the radial direction $\hat{e}_{r,a}$ of the electrode portions 100*a* differs from the radial direction $\hat{e}_{r,b}$ of the electrode portion 100*b*. However, both radial directions $\hat{e}_{r,a}$ and $\hat{e}_{r,b}$ (in general, each radial direction) are directed towards the trapping zone 180, and, at each point (x, y, z) the $\hat{e}_r(x, y)$, $\hat{e}_\varphi(x, y)$, and $\hat{e}_z$ are mutually orthogonal to each other.

In general, as illustrated in particular in FIG. 2, the electrode body and the peak electrode (as well side electrodes) may extend in the direction along the ion trapping zone (i.e. along the "third direction"). It is noted that the circumstance that the electrode body and/or the peak electrodes extend in the third direction may be the reason that the trapping zone extends in the third direction when appropriate voltages are applied to the electrodes. For instance, in FIG. 1A, each of the four electrode portions 100*a*, 100*b*, 100*c*, and 100*d* is shown as extending in the z-direction, which is the direction along the trapping zone.

Electrode Portion(s)

In general, a 3D ion trap may comprise a plurality of electrode portions or, in a specific example shown in FIGS. 1A, 1B, 3A, and 3B, (trap) blades. For instance, as illustrated in FIGS. 1A, 1B, 3A, and 3B, there may be four electrode portions. However, the present disclosure is not limited to any particular number of electrode portions in the ion trap. Furthermore, in general, any number (e.g. one, some, or each) of the electrode portions may be as described herein, e.g. in particular may have a connection through the electrode body. For instance, as illustrated in FIG. 3B, there may be four electrode portions, and each of them may have a connection connecting the respective peak electrode of said electrode portion through the substrate as described herein.

In general, the plurality of electrode portions may be arranged so that their respective peak electrodes equidistantly surround the trapping zone. In other words, the distance of the peak electrodes from a center of the trapping zone may be the same for some or all of the peak electrodes. Alternatively or in addition, the directions and/or positions at which the individual electrode portions are located from the center position of the trapping zone may be related to each other by a discrete rotational symmetry around the trap axis (the order of the discrete rotational symmetry corresponding to the number of electrodes). For instance, in FIG. 2, there are four electrodes which are at directions related by rotations around the z-axis by angles of 90°, 180°, and 270°. In other words, the centers of the peak electrodes of the four peak electrodes are from the trapping zone at directions (1,1,0), (−1,1,0), (−1,−1,0), and (1,−1,0), respectively. Thus, in general, the electrode bodies and/or the peak electrodes may be positioned and/or oriented around the trapping zone in a symmetric way (e.g. a discrete rotational symmetry around an axis, here referred to as trap axis). The peak electrode(s) and/or the side electrodes (e.g. shielding electrodes) may be metallized on the electrode body.

Electrode Body

In general, an electrode body is made (mainly) of an electrically insulating (or electrically non-conducting) substrate/material. In particular, the substrate material may be an insulator such as a glass, diamond, sapphire, a ceramic, etc. or a semiconductor with sufficiently high resistivity and low radio frequency (RF) loss, e.g. intrinsic Si. In general, the electrode body may include a plurality of these materials. However, with respect to an electrode body made of a semi-conductor, an electrode body made of an insulator, such as glass/diamond/sapphire, may improve the RF properties of the substrate and avoid static stray fields, may reduce cross talk between multiple different through substrate vias (TSVs), and/or may allow to provide optical access through the electrode body.

The electrode body thus electrically insulates different electrodes provided on said electrode body from each other, which may allow to apply mutually different voltages to a plurality of electrodes located on the surface of the electrode body.

The electrode body of an electrode portion may include an elongated portion that is elongated in a direction towards the trapping zone, which is here also referred to as “first direction”. The elongated portion may correspond to the entire electrode. However, the present disclosure is not limited to such configuration. For example, the electrode body may be a part of the body of the entire trap which may be monolithic or non-monolithic. Thus, there may be portions such as the basis to or by which the electrode body is fixed within the trap that may be wider than the length of the elongated portion.

Said first direction may be orthogonal to the direction along the trapping zone, which is here also referred to as third direction. The first direction may be the radial direction and the third direction may be the axial or symmetry axis direction of an ion trap with a rotational symmetry as explained above.

It is noted that the first direction does not need to be the same as the center axis of the electrode body, because in general, the electrode body and/or the elongated portion does not have to be symmetrical around its central axis. Thus, the center axis of the electrode body or the elongated portion does not need to extend directly radial towards the trapping zone, even if the first direction is considered to be radial, orthogonal to the direction along the trapping zone.

It is further noted that the first direction does not need to be radial. It is conceivable to have the elongated portion extending towards the trapping zone in a first direction that is angled (inclined) relative to the direct, radial direction.

More specifically, “elongated” here refers to the electrode body or the elongated portion of the electrode body being longer in the first direction than in a second direction, which is the direction perpendicular to the first and the third direction.

For example, as shown in FIG. 3A, the electrode portion 100*a* that has a form of a blade, including the electrode body 120*a* already fulfills this condition because $W<L$. However, the electrode body may have a form including a base broader than W and broader than L in general. In some embodiments, the electrode body may fulfil $W/2<L$, with W und L as in FIG. 3A, especially in case of 4 electrodes. In general, narrower blades may provide a better optical access to the trapping zone.

Even though the examples shown in FIGS. 1A, 1B, 3A, 3B, and 4 illustrate 4 blades, it is noted that 2 blades may be sufficient to construe an ion trap. The peak electrodes could be RF electrodes, whereas the ground (GND) may be located on the (both) sides of the blades. In general, for any number of identically constructed blades N (and especially for $N>2$), the construction may fulfil $W/(2\ L)<tan(pi/N)$.

However, it is noted that in general, the ion trap does not have to have identical blades. In particular, it can have any form of the electrode body that does not have to be a blade. Even in such form, TSV represents an efficient way on how to provide power to the electrodes that are close to the trapping zone while still providing sufficient space for optical path towards the trapping zone in order to enable manipulating the trapped ions.

As noted above, said second direction may be the tangential direction of an ion trap with a rotational symmetry. In other words, the (maximal) spatial extension of the electrode body in the direction toward the trapping zone is greater than the (maximal) spatial direction of the electrode body in the direction that is orthogonal to both the direction along the trapping zone and the direction toward the trapping zone. In the following, the first (longer) spatial extension is also referred to as length and the second (smaller) spatial extension is also referred as width of the electrode body. For instance, in the example shown in FIGS. 3A and 3B, the length $L=L_{max}$, which is the (maximal) spatial extension of the electrode body 120*a* in the direction toward the trapping zone ($\hat{e}_{r,a}$ direction) is longer than the width $W=W_{max}$, which is the (maximal) length/spatial extension of the electrode body 120*a* in the “second direction” ($\hat{e}_{\varphi,a}$ direction). It is further noted that the extensions of the electrode body in the direction along the trapping zone may be longer, equal, or shorter than the length of the electrode body. Moreover, the electrode bodies of each of the electrode portions may have the same length, width, and/or spatial extension in the third direction along the trapping zone.

Furthermore, as also illustrated in FIGS. 1A, 1B, 3A, and 3B, the width of the electrode body may in general decrease along the direction towards the trapping zone or comprise at least a portion with a non-increasing or decreasing width towards the trapping zone. For instance, in FIGS. 1A, 1B, 3A, and 3B, the maximum width W, which the width the electrode body or said portion (elongated portion) has at its location(s) farthest away from the trapping zone 180, is larger than the spatial extension v, which is the width the electrode body has at a position that is closer to the trapping zone than said location(s) farthest away. It is noted that the condition does not need to apply for the entire electrode body. For instance, in case of a monolithic trap structure, it may be difficult to delimit the electrode body from the rest of the trap. Moreover, the basis of the electrode body may be broad to be mounted on the trap. Still further, the electrode body may include some trenches such as a trench separating the peak electrode from the side electrodes or the like. In general, the elongated portion of the electrode body may facilitate an efficient trap design with TSV within the electrode body, which may be particularly advantageous for 3D Paul traps (traps different from the surface traps). The width-decreasing design facilitates efficient spatial arrangement of the electrodes within the trap while allowing for stable and robust trap construction.

Although, in FIGS. 1A, 1B, 3A, and 3B, the width of the electrode portions becomes almost zero at the peak (e.g. the position of the electrode closest to the trapping zone/extremity) of the peak electrode 140*a*, the present disclosure is not limited thereto. In general, the width may not decrease to essentially zero at the closest position. Furthermore, the width not necessarily strictly monotonously decreases with decreasing distance from the trapping zone; for instance the width may decrease only monotonously (i.e. it may be constant for some time, while the distance decreases).

Electrodes & Electrode Segments

In general, the electrodes are made of (electrically) conducting material, such as a metal or a semiconductor (e.g. indium tin oxide), or a combination of different electrically conducting materials. For instance, the electrodes may be formed of/by electrically conductive coating on the electrode body.

Peak Electrode(s)

A peak electrode is an electrode located on the extremity of the electrode body, where the term “extremity” refers to a (specific) part of the electrode body (or, specifically, of the surface of the electrode body). Said part is referred to as an extremity since it is (i) closest to the trapping zone among the parts/locations of the electrode body.

(ii) As mentioned above, the width of the electrode body may be decreasing towards the trapping zone. Thus, at the extremity, the electrode body may have its smallest extension in the tangential/second direction at the extremity.

The extremity may be a point, a line, or an area on the surface of the electrode point. For instance, for the ion trap shown in FIGS. 1A-3B, said extremity of each electrode portion corresponds to a line parallel/along the trapping zone. Further note that a peak electrode may not cover the entire extremity and that there may be multiple peak electrodes on the extremity, which are not electrically connected with each other (in particular on the surface of the electrode body). A peak electrode may extend on the surface of the electrode body in particular in the direction along the trapping zone and/or in direction away from the trapping zone. However, at least part of a peak electrode overlaps with the region/location(s) of the electrode body closest to the trapping zone.

Side Electrode(s)

In general, an electrode portions may also comprise one or a plurality of side electrodes. For instance, in FIGS. 1A-3B, electrode portions 100*a*, 100*b*, 100*c*, and 100*d* are shown to have side electrodes 150*a*, 150*b*, 150*c*, and 150*d*, respectively. As can also be seen from FIGS. 1A-3B, there may be two side surfaces, which are located on different sides with respect to the extremity (or with respect to the peak electrodes(s)).

Side electrodes refers to electrodes that are located on a side (surface) of the electrode body. A side surface is a surface that shows away from the trapping zone (e.g. at least does not show towards the trapping zone, "show" may refer to the direction of a normal vector of the surface). A side surface thus usually does not cover part of the surface closest to the trapping zone. Peak electrodes, on the other hand, cover usually at least a part of the surface of the electrode body that is directed to the trapping zone. Side electrodes may extend, on the surface of the electrode body, in the direction along the trapping zone and/or may extend in the direction towards the trapping zone.

Electrode Segmentation

In general, there may be a plurality of peak electrodes on the extremity of an electrode portion (body). More specifically, the peak electrodes of an electrode body may be arranged at mutually different position on the surface of the electrode body, and each of the peak electrode may extend over a part of the extremity closest to the trapping zone. In particular, the plurality of peak electrodes may be separated from each other in the axial direction, and may not be connected with each other (at least on the surface of the electrode body). In other words, the plurality of electrodes of an electrode portion refers to electrodes between which there is no direct electrical contact. The plurality of peak electrodes may thus be electrically insulated from each other (but it is also possible that they are connect with the same port).

Each peak electrode of an electrode portion may be connected with respective connections through the substrate away from the trapping zone. These peak electrodes may have be connected with these TSVs to respective different ports and may thus allow to apply different voltages on the different peak electrodes. However, some or all of the peak electrodes may also be connected to the same port. Furthermore, there may be a plurality of side electrodes on each side of an electrode portion, said side electrodes being separated from each other, for instance in the axial direction, as illustrated e.g. in FIGS. 1A and 1B. Alternatively or in addition, a side electrode may be segmented in the radial direction, i.e. there may be multiple side electrodes on a same side of an electrode portion which are at the same axial position and separated from each other in the radial direction.

For instance, FIGS. 1A-3B show a plurality of side electrodes on each of the two sides of each electrode portions formed by a segmented electrically conductive coating. More specifically, in the shown example, each of the electrode portions has on each of its two sides, 10 side electrodes (in FIG. 1A, three of the side electrodes of electrode portion 100*d* are explicitly indicate as by the reference sign "150*d*"). On the other hand, each of the electrode portions of the exemplary ion trap of FIGS. 1A-3B has only one peak electrode. However, this is only an example and the present disclosure is not limited to any particular scenario with respect to segmentation, i.e. each of the electrodes of the ion trap may or may not be segmented (independently of whether other electrodes are segmented).

Connection

A connection through the insulating substrate is here also referred to as through substrate via (TSV). Such a TSV is in general connected to a peak electrode and leads away, through the substrate/electrode body, from the peak electrode and/or the trapping zone. In other words, a TSV may have (at least) two ends. One end may be connected to a peak electrode, and the other may end at a location farther away from the trapping zone than the location at which it is connected to the peak electrode.

However, the present disclosure is not limited thereto. In general, for instance if the connection is used as a thermal connection, the connection may not be connected with a (i.e. any) peak electrode and may end e.g. on the extremity of the electrode body between two peak electrode segments.

Electric Connection

In general, a connection may be a connection for connecting the peak electrode to a power source. In addition or alternatively, a connection may be for connecting the side electrode to a power source. In such cases, the connection is made of an electrically conducting material and referred to as "electric connection".

In general, an electric connection may lead from the peak electrode (or the side electrode) to a port for connecting the peak electrode (or the side electrode) to a power source. In other words, one end of the electric connection may be connected to a peak electrode (or the side electrode) and the other may be connected to a port or surface routing. Said port may be located on a part of the surface of the electrode body that is farther away from the trapping zone than the peak electrode (in particular a greater distance from the trapping zone in the radial/first direction). Thus, in general, an electrode portion may comprise one or more such ports. There may be one port per TSV and peak electrode (or side electrode). But it is also possible that multiple peak electrodes are connected to a same ports via different TSVs. In FIGS. 1A and 1B, a port of the electrode portion 100*a* is indicated by the square 170*a* at the surface farthest away of the trapping zone 180.

Using a TSV for electrically connecting peak electrodes may allow increase the precision of the ion trap, e.g. by increasing the symmetry of the generated fields. More specifically, for three-dimensional (3D) ion traps, electric connections to individual electrodes are typically routed along the surface of a (non-conducting) substrate, on which the electrodes are placed. In particular, when scaling three-dimensional (3D) ion traps, usually multiple isolated electrodes (in the following also electrode segments) are lined up in a row on a substrate (said row may define or correspond to the trap axis). However, such routing along the surface may limit the routing density, which may lead to a tradeoff between the number of electrodes leads (i.e. electric connections for connecting the electrodes to power source(s)) and the lead resistance/impedance. Routing on the surface may affect the electric field at the ion positions in an undesired way, e.g. due to radio frequency (RF) electric fields from the leads to RF electrodes. In particular, the translation symmetry along the trap axis may be reduced by connections along the surface, which may in turn reduce the symmetry of the generated fields. Furthermore, using an electric connection through the substrate may allow reduce the axial field component of the generated RF fields.

Furthermore, such surface routing may make it difficult to connect island-like electrodes at all, where island-like electrodes refers to electrodes (completely or at least partially) surrounded by other electrodes. For instance, in the example of FIGS. 1A-3B, the peak electrode 140*a*, 140*b*, 140*c* and 140*d* may be considered island-like electrodes, as the side electrodes 150*a*-150*d* do not allow to connect the peak electrodes via the side surfaces. A TSV through the insulating substrate, however, allows for contacting even such island-like (peak) electrodes through the substrate bulk.

Similar advantages are provided by connecting the side electrodes by connections through the substrate of the electrode body.

Furthermore, usage of a TSV for electrically connecting peak electrodes and/or side electrodes may reduce the lead lengths and also resistance per length for connecting said peak electrode to a power source. Such shorter routing may mitigate related problems such as lead impedance, cross talk, RF absorption. In particular, TSV may reduce connection line impedance, which may lead to a better RF grounding, less cross talk, less Johnson noise, and/or generally reduce temporally varying stray fields. A lower electrical resistance of the connection to the electrodes may reduce the generation of heat, which may be important e.g. when using cryogenically cooled ion traps. For instance, to achieve the same electrical resistance per length as a TSV with a cross section diameter of 50 μm, a routing surface with a thickness of 2 μm with a width of ca. 1 mm may be necessary. This may be a rather large width when using a segment width of e.g. ca 300-500 μm.

It may be desirable, to lead the TSV through the substrate centered in at least one dimension. For example, as shown in FIGS. 1A and 1B, the TSV 160*a* is arranged in the middle of the electrode body 120*a* (middle in the second direction). In this exemplary case, the electrode body 120*a* is symmetrical about the TSV in the second dimension and the TSV extends with the electrode body 120*a* in the first direction. Such TSV location may be applicable not only to peak electrodes, but also to side electrodes: the connection from a side electrode may first lead to the center and then lead away from the trapping zone similarly as shown for the peak electrode.

Connection(s) Between Electrodes

Figure 4:
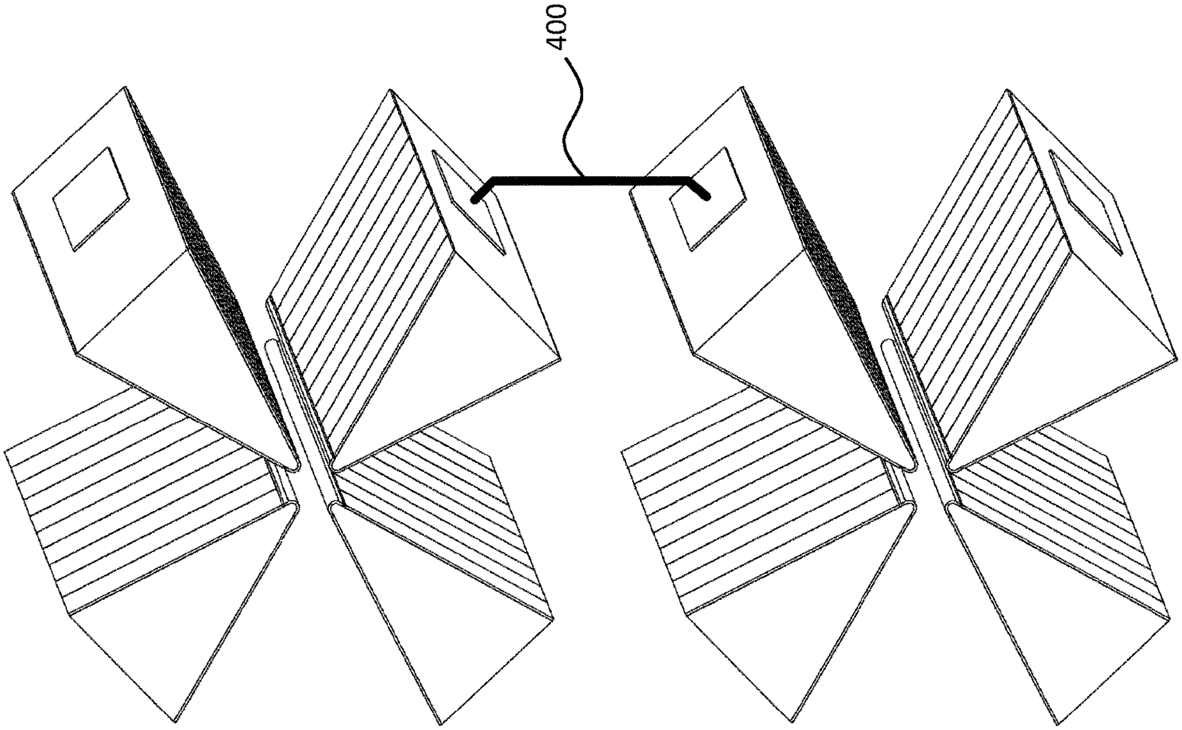
FIG. 4 is a schematic drawing illustrating coupling between two ion traps.

In general, electrical connection through the substrate may be used to connect a peak electrode with:

- another electrode of the same 3D trap (in particular, another peak electrode of said 3D trap); or,
- an electrode of another ion trap (in particular, a peak electrode of another ion trap), as illustrated in FIG. 4.

Such a connection may be established over the port(s) of the TSV(s), as illustrated in FIG. 4.

If said other electrode is an electrode of the same ion trap, it may be a distant electrode, e.g. (i) an electrode of the same electrode portion that is not adjacent to said peak electrode or (ii) an electrode of an electrode portion other than the electrode portion on which said peak electrode is located. In particular, the peak electrode of the electrode portion may be segmented, wherein different peak electrode (segments) have respective TSVs and respective (i.e. different) ports. Two non-adjacent peak electrodes (i.e. there is at least one further peak electrode between said two non-adjacent peak electrodes in the axial direction) may then be connected with each other by connecting the ports of said two non-adjacent peak electrodes with each other.

When the electrical connection is a connection to a (peak) electrode of another ion trap, said other ion trap may also be a 3D trap having TSV(s) as illustrated in FIG. 4, where two traps with a non-segmented peak electrode are connected using the TSVs via a "trap joint" 400 (i.e. a connection connecting the ports of the two TSVs). It is noted that the present disclosure is not limited to the example shown in FIG. 4, as also in case of a connection between different ion traps, one or both ion traps may have segmented peak electrodes.

Similarly, electrical connection through the substrate may be used to connect a side electrode with another electrode of the same 3D trap (in particular, another side electrode of said 3D trap such as a side electrode on another electrode body portion extending towards the trapping zone); or, an electrode of another ion trap (in particular, a side electrode of another ion trap).

In other words, TSVs may realize a wire connecting ions in different trapping zones (e.g. separated/disjoint trapping zones of a same trap or zones of different traps). This may allow to mediate electric coupling between trapped ions in said different zones, which may be used to create entanglement between these ions and/or for sympathetic cooling of these ions even across different traps. Sympathetic cooling refers to the cooling of trapped ions using other trapped ions, e.g. ions trapped in another trapping zone. In particular for high trapping frequencies, such as typically employed for trapping light particles (e.g. electrons) a connection to a cooled circuit may be used for the cooling.

Thermal Connection

In general, a connection may be made of a thermally conducting material so as to conduct heat away from the peak electrode. In particular, the material of the connection may have a higher thermal conductivity than the substrate. Regarding this, it is noted that a thermal connection is not necessarily made of an electrically conducting material (but it may be, in particular as such materials often also have a high thermal conductivity). It is noted that the expressions "thermally conducting", "high thermal conductivity" and the like refer higher thermal conductivity than the (surrounding) substrate.

When the TSV is used as a thermal connection, the connection may or may not be used as an electric connection for said peak electrode (or said side electrode). In particular, a thermal connection may not be connected to an electric port and/or the peak electrode. For instance, one end of a thermal connection may be on the surface of the electrode body between two adjacent peak electrode segments, and the other end of said thermal connection may be next to a port. More specifically, one end of a thermal connection could be connected to a peak electrode, a part of the extremity that is not part of a peak electrode, or a part of the surface of the electrode body between two peak electrodes. Alternatively or in addition, another end of a thermal connection may be connected to a heat sink. For instance, the TSV may establish a (good) thermal connection to the vacuum chamber in which the trap is located or (good) thermal connection to a cold finger of a cryostat (in particular when the ion trap is a cryogenic ion trap).

However, the present disclosure is not limited thereto, as a thermal connection may also be buried in the electrode body. In other words, a TSV used as a thermal connection may have one or multiple ends within the electrode body (i.e. one or more ends that are not at the surface of electrode body).

Using TSV(s) as thermal connection(s) may significantly increase the thermal conductivity (or conductance) of the electrode portion, i.e., the thermal conductivity trough the substrate material may be improved. In other words, the connection may be used to transport heat away from the peak electrodes Frame The 3D ion trap may further comprise a frame (not shown in the figures) that holds the plurality of electrode portions. In particular, the frame may hold the electrode portions fixed at specific positions relative to each other. In general, said frame and the electrode bodies can be formed from the same piece of material or from a plurality of pieces. More specifically:

(i) The electrode bodies and the frame may be one single piece. In other words, the electrode bodies and the frame may form a monolithic construction/structure;

(ii) Each of the electrode bodies as well as the frame may be a different piece, and the electrode bodies are mounted on the frame. In other words, the ion trap may be a piece-wise assembled structure; or (iii) In general, there may be different pieces, where one/some/each of said pieces includes more than just one electrode body or the frame.

System

The present disclosure also provides a system for manipulating (e.g. trapping) ions in an ion trap. The system may comprise any of the 3D ion traps described above.

Furthermore, such a system may comprise one or more power source(s) for supplying AC and/or DC electric power over said power connection in/to each of the one or more of the plurality of electrode portions. Alternatively or in addition, such a system may comprise electrical input(s)/connection(s) at which external power source(s) can be connected.

Moreover, such a system may comprise one or more controllers configured to control the power source(s). For instance, the controller may be configured to control the power source so as to control a state of one or more ions trapped in the trapping zone. In particular, the controller may control the power source so that the ion trap (i.e. the electrodes of the ion trap) generates electric and/or magnetic fields that trap/confine, and/or transport, and/or manipulate the quantum state of the (trapped) ions.

More specifically, the controller may control the power/voltage(s) that is applied to each of the electrodes (in particular to the port of the peak electrode of the 3D ion traps. In other words, the controller may directly control the power sources or control (e.g. only) the voltages that are applied at the electrodes/the electrode contacts (in the latter case, the voltages applied at the electrodes may be different than the voltages of the power sources). The control of the voltages may include a modulation of the voltages. In particular, in order to confine the ions radially with respect to the trap axis, the voltages that are to be applied to the electrodes shown in FIGS. 1A-3B are typically radio frequency (RF) voltages. Thus, the controller may modulate the voltages applied to these electrodes with an RF frequency. The RF electrodes could be supplemented by endcap electrodes (which are not shown in the figures) which confine the ions in the axial direction when Direct Current (DC) voltages are applied. Alternatively or in addition suitable DC voltages are applied to the segmented side electrodes to confine the ions in axial direction and tune the confining axial and radial confining potential, for instance to transport ions along the axial direction. Such DC voltages may also be controlled by the controller.

Fabrication

Figure 5:
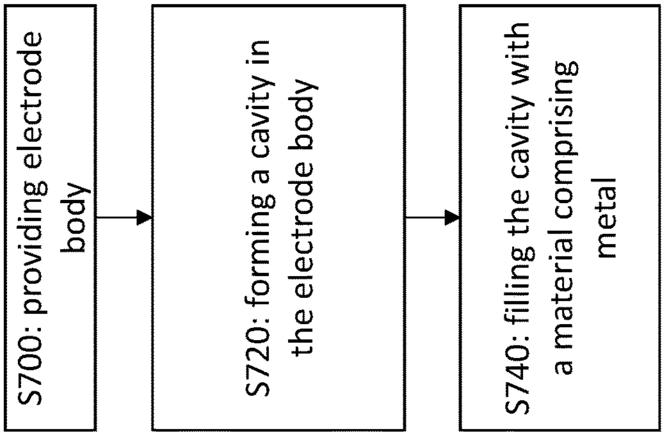
FIG. 5 is a flowchart illustrating exemplary steps for manufacturing an ion trap.

The present disclosure also provides manufacturing methods for manufacturing/producing ion traps and/or electrode portions as described above. As illustrated in FIG. 5, such a manufacturing method may in general comprise a step of providing S700 the electrode body; forming S720 a cavity in the electrode body; and filling S740 the cavity with a material comprising metal. However, in general, the connections may be manufactured using any established technique for manufacturing through-silicon or through substrate vias.

The cavity may for instance be formed S720 by a laser drilling process or an etching process. The etching may e.g., be a laser induced etching, and/or anisotropic etching. In other words, a substrate material, corresponding to the electrode body of the manufactured electrode portion, with one or more adequate holes is produced. For instance, for each connection a corresponding cavity/hole may be formed through the electrode body. A hole may thus correspond to the path the connection is to take trough the electrode body, and may be formed from one side to another side of the substrate.

Furthermore, the filling S740 of the cavity may e.g. be performed by a vapor deposition process, a galvanic deposition process, or by a self-assembling e.g. utilizing ferromagnetic materials assisted by magnetic fields. For instance, the vapour deposition process may be or include a chemical vapor deposition. Alternatively or in addition, electro plating (e.g. bottom up plating and/or side wall plating) may be used. Thus, in general, in the filling step S740, the hole is filled with a (electrically and/or thermally) conductive material.

The electrodes may be fabricated using micro-fabrication techniques (e.g. by evaporative or sputter coating of a metal layer onto the electrode body, followed by a laser patterning step to form the individual electrode segments, and/or the metal coating can be done on an electrode body where electrode segments have before been patterned by laser induced etching techniques.

Further Aspects

The embodiments and exemplary implementations mentioned above show some non-limiting examples. It is understood that various modifications may be made without departing from the claimed subject matter. For example, modifications may be made to adapt the examples to new systems and scenarios without departing from the central concept described herein.

Summarizing the above, the present disclosure provides electrode portions for generating electric and/or magnetic fields for trapping ions in a trapping zone, a three-dimensional (3D) ion trap comprising one or more of such electrode portions, systems for trapping ions with such a 3D ion trap, as well as methods for manufacturing such electrode portions. An electrode portion comprises an electrode body made of an electrically insulating substrate and elongated in a first direction towards the ion trapping zone, a peak electrode located on an extremity of the electrode body closest to the trapping zone, and a connection connected to the peak electrode and leading from the peak electrode through said electrode body away from the trapping zone.

According to a first aspect, a three-dimensional ion trap is provided. The three-dimensional ion trap comprises a plurality of electrode portions for trapping ions in a trapping zone. Each of one or more of said plurality of electrode portions comprises: (i) an electrode body made of an electrically insulating substrate and elongated in a first direction towards the ion trapping zone; (ii) a peak electrode located on an extremity of the electrode body closest to the trapping zone; and (iii) a connection connected to the peak electrode and leading from the peak electrode through said electrode body away from the trapping zone.

According to an aspect, a three-dimensional ion trap is provided. The three-dimensional ion trap comprises a plurality of electrode portions for trapping ions in a trapping zone. Each of the one or more of said plurality of electrode portions comprises (i) an electrode body made of an electrically insulating substrate and including a portion extending in a first direction towards the ion trapping zone; (ii) a side electrode located on the electrode body laterally of an extremity of the electrode body closest to the trapping zone; and (iii) a connection connected to the side electrode and leading from the side electrode through said electrode body away from the trapping zone.

According to a second aspect provided in addition to the first aspect, a width of the electrode body in a second direction, which is perpendicular to the first direction and to a third direction along the ion trapping zone, decreases along the first direction towards the ion trapping zone.

According to a third aspect provided in addition to the second aspect, the electrode body and the peak electrode extend in the third direction along the ion trapping zone.

According to a fourth aspect provided in addition to the second or the third aspect, any of the one or more of said plurality of electrode portions further comprises: (i) one or more first side electrodes that are located on a side of the electrode body; and/or (ii) one or more second side electrodes that are located on another side of the electrode body; wherein each of the one or more first side electrodes and the one or more second side electrodes extends in the third direction.

According to a fifth aspect, provided in addition to one of the first to fourth aspect, any of the one or more of said plurality of electrode portions further comprises a port for connecting the peak electrode to a power source; and the connection is an electric connection that leads from the peak electrode to the port.

According to a sixth aspect, provided in addition to one of the first to fifth aspect, in any of the one or more of said plurality of electrode portions, the connection is an electric connection which connects the peak electrode with another electrode of the same three-dimensional ion trap or of another ion trap so as to mediate electric coupling between trapped ions.

According to a seventh aspect provided in addition to one of the first to sixth aspect, each of the one or more electrode portions comprises: (i) another peak electrode located on the extremity of the electrode body, and (ii) another connection that is connected to the other peak electrode and leading from the other peak electrode through the electrode body away from the trapping zone, wherein the other peak electrode is an electrode other than the peak electrode, the other connection is a connection other than the connection connected to the peak electrode, and the other peak electrode is at different position along the trapping zone than the peak electrode.

According to an eighth aspect provided in addition to one of the first to seventh aspect, the connection is made of a thermally conducting material so as to conduct the heat away from the peak electrode.

According to a ninth aspect provided in addition to any one of the first to eighth aspect, said one or more of the plurality of electrode portions are four electrode portions arranged so that their respective peak electrodes equidistantly surround the trapping zone, and the three-dimensional ion trap further comprises a frame that holds said four electrode portions.

According to a tenth aspect a system for manipulating ions in an ion trap is provided. The system comprises: (i) the three-dimensional ion trap according to any of the first to ninth aspect; (ii) a power source for supplying electric power over said power connection in each of the one or more of the plurality of electrode portions; and (iii) a controller to control the power source so as to control a state of one or more ions trapped in the trapping zone.

According to an eleventh aspect a method for manufacturing an ion trap according to any of claims 1 to 9 is provided. The method comprises. (i) providing said electrode body; (ii) forming a cavity in the electrode body; and (iii) filling the cavity with a material comprising metal.

According to a twelfth aspect provided in addition to the eleventh aspect, the forming of the cavity is performed by laser drilling process or etching process.

According to a thirteenth aspect, provided in addition to the eleventh or twelfth aspect the filling of the cavity is performed by a vapor deposition processes, a galvanic deposition processes, or by a self-assembling utilizing ferromagnetic materials assisted by magnetic fields.

The invention claimed is:

1. A three-dimensional ion trap comprising a plurality of electrode portions for trapping ions in a trapping zone, wherein at least one electrode portion of said plurality of electrode portions comprises:

an electrode body comprising an electrically insulating substrate and comprising a portion extending in a first direction towards the ion trapping zone;

a peak electrode located on an extremity of the electrode body closest to the trapping zone;

a side electrode located on the electrode body laterally of the extremity; and a connection connected to the peak electrode or to the side electrode and leading through said electrode body away from the trapping zone, wherein a width of said portion of the electrode body in a second direction, which is perpendicular to the first direction and to a third direction along the ion trapping zone, decreases along the first direction towards the ion trapping zone.

2. The three-dimensional ion trap according to claim 1, wherein the electrode body and the peak electrode extend in the third direction along the ion trapping zone.

3. The three-dimensional ion trap according to claim 1, wherein the at least one electrode portion of said plurality of electrode portions comprises:

the side electrode that is a first side electrode located on a first side of the electrode body, and/or a second side electrode that is located on another, second side of the electrode body, wherein the first side electrode and the second side electrode extend in the third direction.

4. The three-dimensional ion trap according to claim 1, wherein the at least one electrode portion of said plurality of electrode portions further comprises a port for connecting the peak electrode or the side electrode to a power source; and the connection is an electric connection that leads from the peak electrode or the side electrode to the port.

5. The three-dimensional ion trap according to claim 1, wherein the connection is an electric connection which connects the peak electrode with another electrode of the same three-dimensional ion trap or of another ion trap so as to mediate electric coupling between trapped ions.

6. The three-dimensional ion trap according to claim 1, wherein the at least one electrode portion of said plurality of electrode portions comprises:

another peak electrode located on the extremity of the electrode body, and another connection that is connected to the other peak electrode and leading from the other peak electrode through the electrode body away from the trapping zone, wherein the other peak electrode is an electrode other than the peak electrode, the other connection is a connection other than the connection connected to the peak electrode, and the other peak electrode is at a different position along the trapping zone than the peak electrode.

7. The three-dimensional ion trap according to claim 1, wherein the connection is made of a thermally conducting material so as to conduct the heat away from the peak electrode or the side electrode.

8. The three-dimensional ion trap according to claim 1, wherein the at least one electrode portion of the plurality of electrode portions comprises four electrode portions arranged so that each peak electrode of the respective plurality of peak electrodes equidistantly surround the trapping zone, and the three-dimensional ion trap further comprises a frame that holds said four electrode portions.

9. A system for manipulating ions in an ion trap comprising:

the three-dimensional ion trap according to claim 1;

a power source for supplying electric power over said power connection in the at least one electrode portion of the plurality of electrode portions; and a controller to control the power source so as to control a state of one or more ions trapped in the trapping zone.

10. A method for manufacturing an ion trap according to claim 1, comprising:

providing said electrode body;

forming a cavity in the electrode body; and filling the cavity with a material comprising metal.

11. The method according to claim 10, wherein the forming of the cavity is performed by a laser drilling process or an etching process.

12. The method according to claim 10, wherein the filling of the cavity is performed by a vapor deposition processes, a galvanic deposition processes, or by a self-assembling utilizing ferromagnetic materials assisted by magnetic fields.

* * * * *